RECEIVER AMPLIFIER

Filed Sept. 15, 1955 2 Sheets-Sheet 1

INVENTOR.
ROBERT C. GRAY
HARRY A. GREENE, JR.
BY
Flehr & Swain
ATTORNEYS

Aug. 12, 1958 R. C. GRAY ET AL 2,847,506

RECEIVER AMPLIFIER

Filed Sept. 15, 1955 2 Sheets-Sheet 2

INVENTOR.
ROBERT C. GRAY
HARRY A. GREENE, JR.
BY
Flehr & Swain
ATTORNEYS

United States Patent Office 2,847,506

Patented Aug. 12, 1958

2,847,506

RECEIVER AMPLIFIER

Robert C. Gray, San Francisco, and Harry A. Greene, Jr., San Carlos, Calif., assignors to Remler Company, Ltd., San Francisco, Calif., a corporation of California Application September 15, 1955, Serial No. 534,545

9 Claims. (Cl. 179—1)

This invention relates generally to receiver amplifiers and more particularly to receiver amplifiers of the type for use on telephone handsets.

It is well known that individuals who are hard of hearing have difficulty in using the conventional telephone because of the low and non-adjustable output of the receiver amplifier. Individuals that must use the telephone in locations having high-ambient noise conditions also have difficulty in using the conventional telephone for the same reason.

In general it is the object of the present invention to provide a receiver amplifier which can be used by individuals who are hard of hearing and by individuals who must use the telephone in locations having high-ambient noise conditions.

Another object of the invention is to provide a receiver amplifier of the above character which is itself contained, small and compact.

Another object of the invention is to provide a receiver amplifier of the above character which can be carried in the pocket of the individual and attached to the receiver portion of the standard telephone handset and operated without special connections.

Another object of the invention is to provide a receiver amplifier of the above character which is provided with a volume control to accommodate individuals of varying degrees of hearing deficiency and individuals working in locations having different ambient noise conditions.

Another object of the invention is to provide a receiver amplifier of the above character which can be easily clamped onto the receiver of the standard telephone handset and easily removed.

Another object of the invention is to provide a receiver amplifier of the above character in which an induction coil is used to pick up the received message from the receiver of the standard telephone handset.

Another object of the invention is to provide a receiver amplifier of the above character in which a transmitter amplifier is used to amplify the received messages.

Another object of the invention is to provide a receiver amplifier of the above character in which an additional coil is utilized for bucking out or neutralizing extraneous noises picked up by the induction coil.

Additional objects and features of the invention will appear from the following description in which the preferred embodiment has been set forth in detail in conjunction with the accompanying drawings.

Referring to the drawing.

Figure 1:
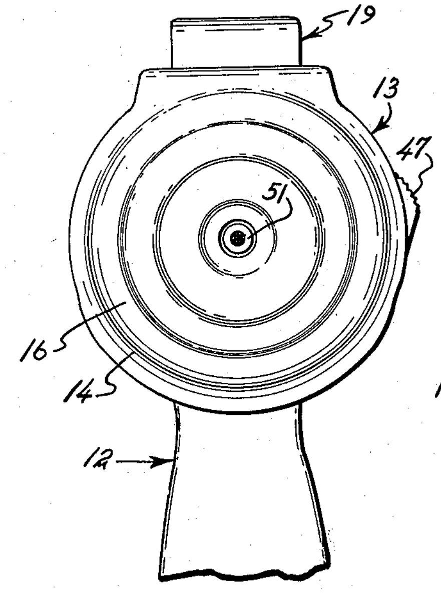
Figure 1 is a front elevational view of a receiver amplifier embodying our invention and mounted on the receiver portion of a conventional telephone handset.

Referring to the drawing, we have shown the receiver portion 11 of a conventional telephone handset 12. Our receiver amplifier 13 is shown clamped to the receiver 11 and consists of a substantially cylindrical housing 14 having an end wall portion 16 and a side wall extension 17. The housing may be molded or formed of a suitable material such as plastic. The housing serves as an enclosure for an amplifier 18.

Figure 3:
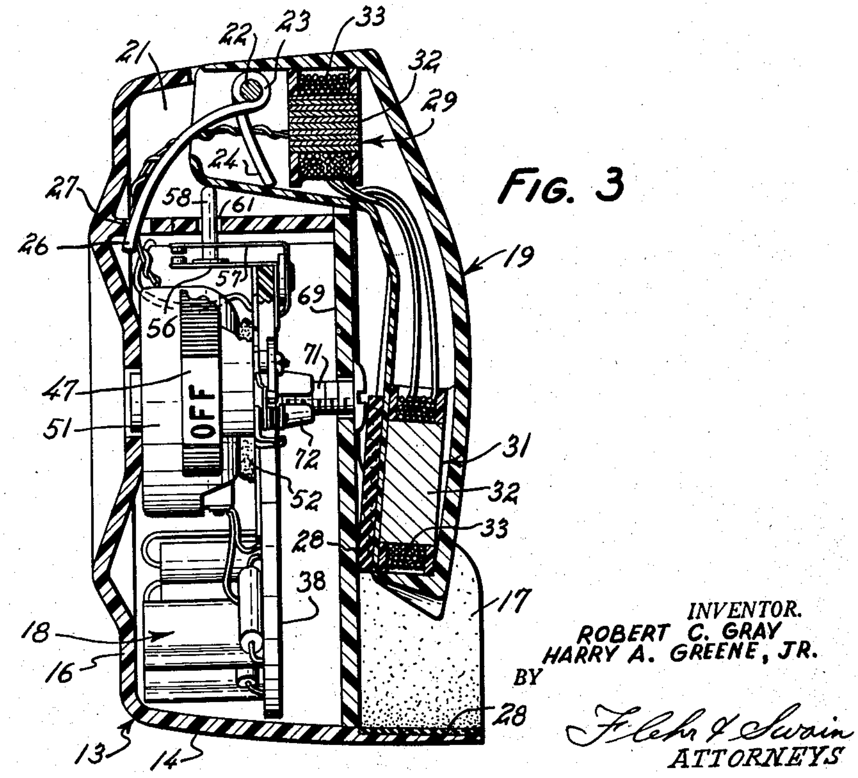
Figure 3 is an enlarged side elevational view in cross section with certain parts broken away showing our receiver amplifier.

The housing carries a clamping arm 19 which is pivotally mounted within a recess 21 in the housing by pin 22. A spring 23 is mounted on the pin and has one end 24 engaging a side wall of the arm 19 and the other end 26 mounted within a hole 27 in the housing to continuously urge the arm 19 towards a folded position as shown in Figure 3 in which it will extend in a plane substantially parallel to the plane of the housing.

Rubberized surfaces 28 are provided on the side wall portion 17 and on the free end of arm 19 opposite the pivoted end to insure that the receiver amplifier will remain mounted on the handset.

A pair of induction coils 29 and 31 are mounted within the clamping arm 19 and each consists of a laminated core 32 of suitable magnetic material and a coil of wire 33 wound about the laminated core. However, the coil of wire on coil 29 is wound in an opposite direction of the coil of wire on coil 31. Coil 31 will be designated the pick up coil and is located in the free end of the arm 19. It is positioned so that the coil is magnetically coupled to the magnetic lines of force created by coil (not shown) in the receiver 11 when the arm 19 extends in a plane at substantially right angles to the plane of the housing. The other coil 29 will be designated the neutralizing coil and is placed at the end of the arm 19 near the pivoted end so that its magnetic axis is substantially parallel to the magnetic axis of the coil 31 for a purpose hereinafter described.

The amplifier 18 is carried by a mounting block 38 which is fastened within the housing to a pair of studs 39 which are an integral part of the housing by screws 41. The amplifier 18 may be of any suitable type adapted for enclosing within a very limited space. We have found it desirable to use a transistor amplifier because of the limited space and power requirements. Since such amplifiers are well known in the art, our amplifier will not be described in detail. The transistors, capacitors and resistors used in the amplifier are mounted on one side of the mounting plate 38 as shown and their leads extend through the mounting plate and are soldered together in a predetermined manner on the other side of the mounting plate.

A combined switch and volume control device 47 is carried by the mounting plate 38. The switch portion *47a* of the device is connected to the amplifier 18 and serves to turn the receiver amplifier on and off as hereinafter described. The volume control portion of the device consists of a potentiometer which is connected to the transistor amplifier 18 in a manner well known to those skilled in the art to vary the output of the amplifier.

A receiver unit 51 is also carried by the mounting plate and rests upon resilient means 52 of suitable material such as foam rubber. The receiver unit is of a type used in hearing aids and is well known to those skilled in the art and will not be described in detail.

Figure 2:
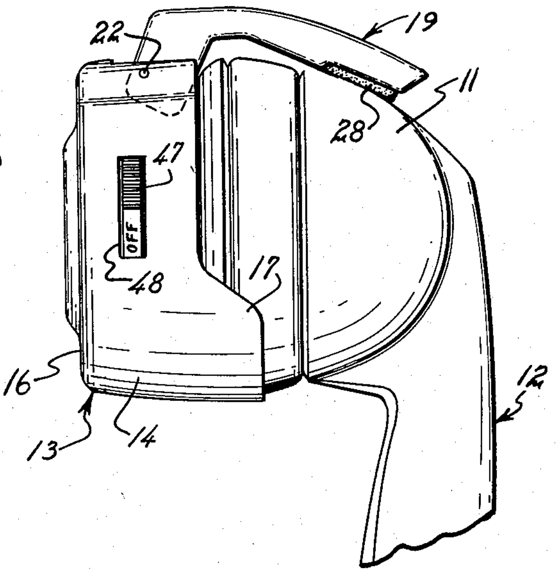
Figure 2 is a side elevational view of the receiver amplifier shown in Figure 1.

An additional switch 54 is carried by the mounting plate and consists of two leaves 56 and 57. A pin 58 is fixed to leaf 56 and extends through an opening (not shown) in lead 57 and then through an opening 61 in the housing and into recess 21 where it is adapted to be engaged by the clamp 19. When the clamp 19 is in the position shown in Figure 3, the switch 54 is open as shown whereas when the clamp 19 is raised as shown in Figures 1 and 2 the pin 58 is released and switch 54 is closed for a purpose hereinafter described.

Figure 4:
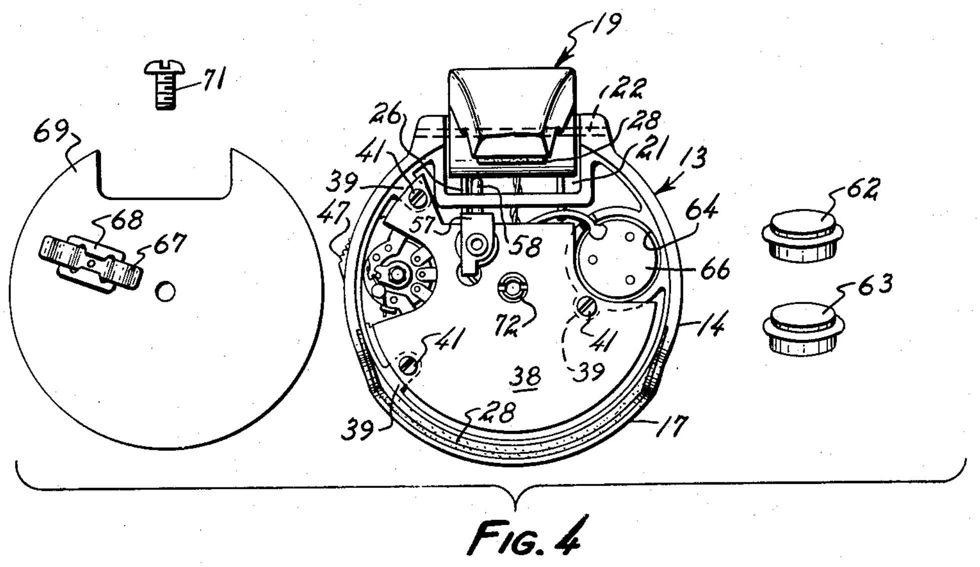
Figure 4 is a rear elevational view of our receiver amplifier with the clamp raised and the back cover and batteries removed and placed on opposite sides.

A pair of batteries 62 and 63 are mounted within the circular enclosure 64 which is an integral part of the housing 14. In Figure 4, the batteries are shown removed from the circular enclosure and placed to the side of the housing to facilitate description of the receiver amplifier. The batteries may be of any suitable type such as the self-contained inexpensive mercury cell battery, the RM-625, manufactured by Mallory.

In the bottom of the circular enclosure 64, is mounted a conducting disc 66 which is connected to the amplifier 18 in a manner hereinafter described. The disc is adapted to engage the positive terminal of the lower battery 62. The negative terminal of the upper battery 63 is adapted to be engaged by a spring contact 67 mounted within a recess 68 in a back cover plate 69. The cover plate 69 is secured to the mounting plate 38 by a screw 71 threaded into a nipple 72 by the mounting plate.

Figure 5:
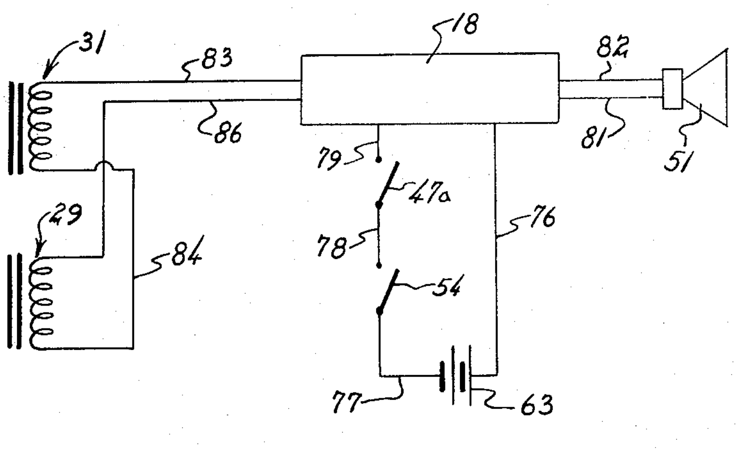
Figure 5 is a view schematically illustrating portions of our receiver amplifier together with the electrical circuit connections.

The circuit diagram for interconnecting the above mentioned elements is shown in Figure 5. The positive terminal of the battery 62 is connected to the amplifier 18 by a conductor 76 and the negative side of the battery 63 is connected to one side of the switch 54 by conductor 77. The other side of the switch 54 is connected to one side of the switch 47 by conductor 78 and the other side of switch 47 is connected to the amplifier 18 by conductor 79. The receiver unit 51 is connected to the amplifier 18 by conductors 81 and 82.

One end of the wire coil for induction coil 31 is connected to the amplifier 18 by a conductor 83 and the other end of the same coil is connected to one end of the wire coil for induction coil 29 by conductor 84. The other end of the coil for induction coil 29 is connected to the amplifier 18 by conductor 86.

The operation of our receiver amplifier may now be described as follows:

Let it be assumed that our receiver amplifier is in the position shown in Figure 3 in which the clamping arm 19 is lying adjacent the back cover plate 69 in a plane substantially parallel to the housing 13. If it is now desired to use our receiver amplifier it is merely necessary to lift the clamp 19 away from the back cover plate 69 until it extends at substantially right angles to the plane of the back cover plate. The device is then slipped over the receiver portion of a conventional telephone handset in such a manner that the extension 17 grasps a portion of the outer circumference of the receiver unit and the arm 19 grasps a portion of the receiver unit opposite the extension 17 as shown in Figures 1 and 2. The rubberized surfaces 28 on the extension 17 and the arm 19 insure that the receiver amplifier will be retained on the receiver unit. The spring 23 serves to continuously urge the arm 19 towards the position shown in Figure 3 and causes our receiver amplifier to firmly grasp the receiver portion of the telephone handset.

When the arm 19 is raised, the pin 59 is released allowing the switch 54 to close. This places the device in position to be operated by the "on-off" switch 47*a*. Switch 47*a* is then rotated to the "on" position which closes the battery circuit of the amplifier 18 as shown in Figure 5 and energizes the same. The amplifier operates almost immediately and is in condition to amplify any signals received from induction pick-up coil 31.

The induction pick-up coil 31 is adjacent to the magnetic field created by the coil in the receiver unit of the telephone handset when the clamping arm 19 engages the receiver portion 11 as shown in Figure 2. The coil 31 is thus magnetically coupled to the coil in the receiver unit. It has been found that a very clear signal can be obtained from induction coil 31 which can be readily amplified to the desired level by the amplifier 18. The output of amplifier 18 is fed into the receiver unit 51. However, it has been found that the coil 31 will also pick up other extraneous fields which may be present in the vicinity of the coil. The signals from these extraneous fields normally would also be amplified which would raise the noise level in the amplified signal. To overcome this objection we have placed another induction coil 29 so that its magnetic axis is substantially parallel to the magnetic axis of the pick-up coil 31 and have wound coil 31 in an opposite direction to coil 29 so that the voltages induced in each of the coils will be of reverse polarity. It has been found that this additional coil also picks up signals from extraneous fields which may be in the area and because of the reverse polarity it bucks out or neutralizes the signals picked up from the extraneous fields by the pick-up coil 31. That is the voltage induced in one coil is opposed by the voltage induced in the other coil. The extraneous fields are oriented in heterogeneous directions and hence would be picked up more or less equally by both coils 29 and 31.

It will be noted that the neutralizing coil 29 is located a greater distance from the coil of the receiver unit and hence is much less likely to pick up the magnetic fields created by the coil of the receiver portion 11.

By utilizing two coils in this manner, it has been found that only the signal picked up from the receiver unit will be amplified whereas the signals picked up from the extraneous fields will be neutralized or bucked out thus giving a clear amplified signal to the user of our device.

Our device has been found to be particularly suited for use by people who are hard of hearing because it can be carried about in the pocket of the user and placed on the receiver unit of the telephone handset whenever required. The two switches 47*a* and 54 are provided so that in case the operator fails to turn the switch 47 to the "off" position, the battery circuit will still be opened when the unit is removed from the telephone handset. This serves to prevent a drain on the batteries when the device is not in use.

Our device has also been found to be particularly suitable for use by individuals who are working at locations having high ambient noise conditions. It serves to amplify the signal received to a level to allow the using individual to carry on a telephone conversation even though he may be in a very noisy location. Our device is particularly suited for this application because it does not pick up or amplify surrounding acoustic noise or extraneous magnetic fields.

Our receiver amplifier is of compact design and can be used on the conventional handset without a wired connection. The adjustable volume control permits the user to adjust the gain to correct for his particular hearing deficiency. By way of example, one receiver amplifier we have constructed had an acoustic gain of 49 decibels over the incoming signal and a maximum acoustic output of 122 decibels (relative to .0002 dyne per square centimeter). Thus, it is possible for individuals to use our device even though they may have greatly varying hearing deficiencies or may be working in locations having very different ambient noise conditions.

The use of a transistor amplifier makes it possible to build the amplifier within the housing with self-contained batteries.

From the foregoing, it is apparent that we have provided a receiver amplifier which can be used on the receiver portion of a conventional telephone handset to amplify the received signal so that the telephone can be used in a normal manner by those hard of hearing and those working in locations having high ambient noise conditions.

We claim:

1. In a receiver amplifier of the type adapted to be attached to the receiver portion of a conventional telephone handset, a housing adapted to be attached to the receiver portion, a clamping arm pivotally connected to said housing and movable between a position parallel to the plane of the housing and a position at substantially right angles to the plane of the housing, pick-up means mounted in said clamping arm for picking up the signal from the receiver portion, amplifier means connected to said pick-up means and mounted within said housing for amplifying the signal picked up by said pick-up means, a receiver unit connected to said amplifier, neutralizing means mounted in said clamping arm for neutralizing or balancing out any extraneous signals picked up by said pick-up means from extraneous fields, and means for supplying power to said receiver amplifier, said last named means including a switch adapted to be operated by movement of said clamping arm, the switch being in closed position when said clamping arm is extending in a plane substantially at right angles to the plane of the housing and open when said clamping arm is extending in a plane substantially parallel to the plane of the housing.

2. In a receiver amplifier of the type adapted to be attached to the receiver portion of a conventional telephone handset, a housing, an extension on one side of said housing adapted to fit over the portion of the outer circumference of the receiver portion of the telephone handset, a clamping arm on the opposite side of said housing and having one end pivotally mounted on said housing, the free end of said arm being adapted to fit over a portion of the outer circumference of the receiver portion, a pick-up coil having a winding mounted in said clamping arm and adapted to pick up a signal from the receiver portion, a neutralizing coil in said clamping arm and having a winding wound in an opposite direction from the winding on said pick-up coil, the magnetic axis of the neutralizing coil being substantially parallel to the magnetic axis of the pick-up coil, an amplifier connected to said coils, a receiver unit connected to said amplifier, and power supply means.

3. In a receiver amplifier of the type adapted to be attached to the receiver portion of a conventional telephone handset, a housing, an extension on one side of said housing adapted to fit over a portion of the outer circumference of the receiver portion of the telephone handset, a clamping arm on the opposite side of said housing having one end pivotally mounted on said housing, the free end of said clamping arm being adapted to fit over a portion of the outer circumference of the receiver portion, a pick-up coil mounted in said clamping arm and adapted to pick up a signal from the receiver portion of the telephone handset, a neutralizing coil, the magnetic axis of the neutralizing coil being substantially parallel to the magnetic axis of the pick-up coil and connected to neutralize any extraneous signals picked up by the pick-up coil, an amplifier in said housing connected to said pick-up and neutralizing coils, a receiver unit in said housing connected to said amplifier, a power supply, circuitry connecting the power supply to the amplifier, and a switch and volume control unit mounted within said housing, the switch serving to connect and disconnect the power supply from the amplifier and the volume control serving to vary the gain of the amplifier.

4. In a receiver amplifier of the type adapted to be attached to the receiver portion of a conventional telephone handset, a housing, an extension on one side of said housing adapted to fit over a portion of the outer circumference of the receiver portion of the telephone handset, a clamping arm on the opposite side of said housing and having one end pivotally mounted on said housing, the free end of said clamping arm being adapted to fit over a portion of the outer circumference of the receiver portion of the telephone handset, the clamping arm when fitted on the receiver portion of the telephone handset extending substantially at right angles to the plane of the receiver amplifier, spring means mounted in said clamping arm for continuously urging said clamping arm towards a position in which it will extend in a plane parallel to the plane of the receiver amplifier, a pick-up coil mounted in said clamping arm adapted to pick up a signal from the receiver portion of the telephone handset, a neutralizing coil in the end of said clamping arm remote from the end containing the pick-up coil, the magnetic axis of the neutralizing coil being substantially parallel to the magnetic axis of the pick-up coil, an amplifier in said housing connected to said neutralizing and pick-up coils, a receiver unit in said housing connected to said amplifier, power supply means mounted in said housing to make said receiver amplifier a self-contained unit, circuitry connecting said power supply to the amplifier, said circuitry including a switch mounted in said housing and adapted to be operated by movement of said clamping arm, the switch being in a closed position when said clamping arm is extending at right angles to the plane formed by the housing and being open when said clamp extends in a plane parallel to the plane of the housing, and a combination "on-off" switch and volume control mounted in said housing, the "on-off" switch being connected in series with first named switch and the volume control being connected to said amplifier to vary the gain of the amplifier.

5. In a self-container receiver amplifier adapted to be attached to the receiver portion of a conventional telephone handset, a housing adapted to be attached to the receiver portion of the handset, electromagnetic pickup means mounted on said housing for picking up the signal from the receiver portion of the telephone handset, amplifier means mounted in the housing and connected to said pickup means, a receiver unit mounted in the housing and connected to said amplifier, and electromagnetic means spaced from said pickup means for neutralizing or bucking out extraneous electromagnetic signals picked up by said pickup means from extraneous fields.

6. A receiver amplifier as in claim 5 wherein the magnetic axes of said pickup means and the neutralizing means are substantially parallel.

7. In a receiver amplifier of the type adapted to be attached to the receiver portion of a conventional telephone handset, a housing, an extension on one side of said housing adapted to fit over a portion of the outer surface of the receiver portion of the telephone handset, a clamping arm on the opposite side of said housing and having one end pivotally mounted on said housing and having the free end adapted to fit over a portion of the outer surface of the receiver portion of the telephone handset, an electromagnetic pickup coil mounted in the free end of said clamping arm and adapted to pick up a signal from the receiver portion of the telephone handset, an amplifier connected to said pickup coil, and a receiver unit connected to said amplifier.

8. A receiver amplifier as in claim 7 together with a neutralizing coil mounted in said clamping arm adjacent the pivoted end of the arm, the pickup and neutralizing coils having substantially parallel magnetic axes, one coil being wound in a direction opposite to that of the other.

9. A receiver amplifier as in claim 7 together with a neutralizing coil spaced from said pick-up coil.

References Cited in the file of this patent

UNITED STATES PATENTS

| | | |
|---|---|---|
| 2,160,829 | Cherry | June 6, 1939 |
| 2,268,665 | Loewe | Jan. 6, 1942 |
| 2,416,082 | Balmer | Feb. 18, 1947 |
| 2,544,027 | King | Mar. 6, 1951 |